INVENTORS
WAYNE I. ALHOLM
RICHARD C. BOULTON
WILLIAM B. HARRISON
BY
ATTORNEY

Aug. 13, 1968   W. I. ALHOLM ET AL   3,396,698
APPARATUS FOR LINING GASKET-FORMING COMPOSITIONS IN CLOSURES
Filed Feb. 20, 1967   3 Sheets-Sheet 2

INVENTORS
WAYNE I. ALHOLM
RICHARD C. BOULTON
WILLIAM B. HARRISON
BY Metro Kalimow
ATTORNEY INVENTORS
WAYNE I. ALHOLM
RICHARD C. BOULTON
WILLIAM B. HARRISON
BY *Metro Kalimou*
ATTORNEY United States Patent Office 3,396,698
Patented Aug. 13, 1968

3,396,698
APPARATUS FOR LINING GASKET-FORMING COMPOSITIONS IN CLOSURES
Wayne I. Alholm, Stoughton, Richard C. Boulton, Waltham, and William B. Harrison, Dedham, Mass., assignors to W. R. Grace & Co., Cambridge, Mass., a corporation of Connecticut
Filed Feb. 20, 1967, Ser. No. 617,123
5 Claims. (Cl. 118—318)

ABSTRACT OF THE DISCLOSURE

An apparatus for lining container closures with gasket-forming compositions which includes a feeder which moves closures from a closure feed source and positively places the closure at the station where it is lined.

Background of the invention

This invention relates to high speed container closure lining machinery.

The hermetic seal which is interposed between a container and its closure usually is formed of a compressible, distortable substance which is placed in the sealing area of the closure and is known as "the lining." Linings are usually applied to a closure in the form of a liquid which is released through a nozzle working in timed relation to the movement of the closures as they pass through the lining machine. Normally, closures, such as threaded or lug caps, are placed on a rotating chuck and the nozzle through which the lining composition is ejected is so positioned that the composition forms a band around the sealing periphery as it flows from the nozzle. In the case of bottle crowns, the composition is deposited in the center of the panel and it is spread across the whole sealing panel as the chuck rotates.

As closure lining machinery has been improved, design speed has been substantially increased. However, at speeds of approximately 350 to 400 closures a minute, the operation of present-day lining machines becomes undependable despite careful attention to dynamic stability. To avoid lost time from jams and the resulting disruption of production schedules, the maximum speed of present-day lining machines rarely exceeds 300 to 400 closures per minute.

Metallic burrs and slight inaccuracies of the closures themselves contribute to misfeeding at the higher speeds. It has also been found that the atmosphere surrounding the rapidly reciprocating parts is an important cause of high speed misfunction because the closures are deflected out of position by the surging air mass that surrounds them. In present-day lining machines, the closures are stripped from a feed stack or released from a feed chute by an escapement mechanism and, otherwise unrestrained, are pushed onto the revolving chuck by a reciprocating part or by a star wheel.

Summary of the invention

In the improved machine of the present invention, the closures are engaged by a positive feeder. This feeder is adapted to fit inside the skirt of the closure, press it into firm contact with the floor of the feed chute and carry it forward to be released only after the closure has been accurately seated and gripped by the rotating chuck.

A surprising increase in machine dependability results. Tilting of the closure by air currents and misplacement of the closure on the chuck are eliminated. In particular, nesting of closures is avoided. This is particularly troublesome with the tab closures which include a flap extending radially outwardly from one side of a crown and which are now used on many soft drink and beer containers. Spinouts which are caused by burrs do not occur since the closure is positively held in its intended pathway throughout the time of its approach to the lining station. In consequence, the improved machines operate without interruption for longer times than heretofore has been possible.

Description of the preferred embodiment(s)

Figure 1:
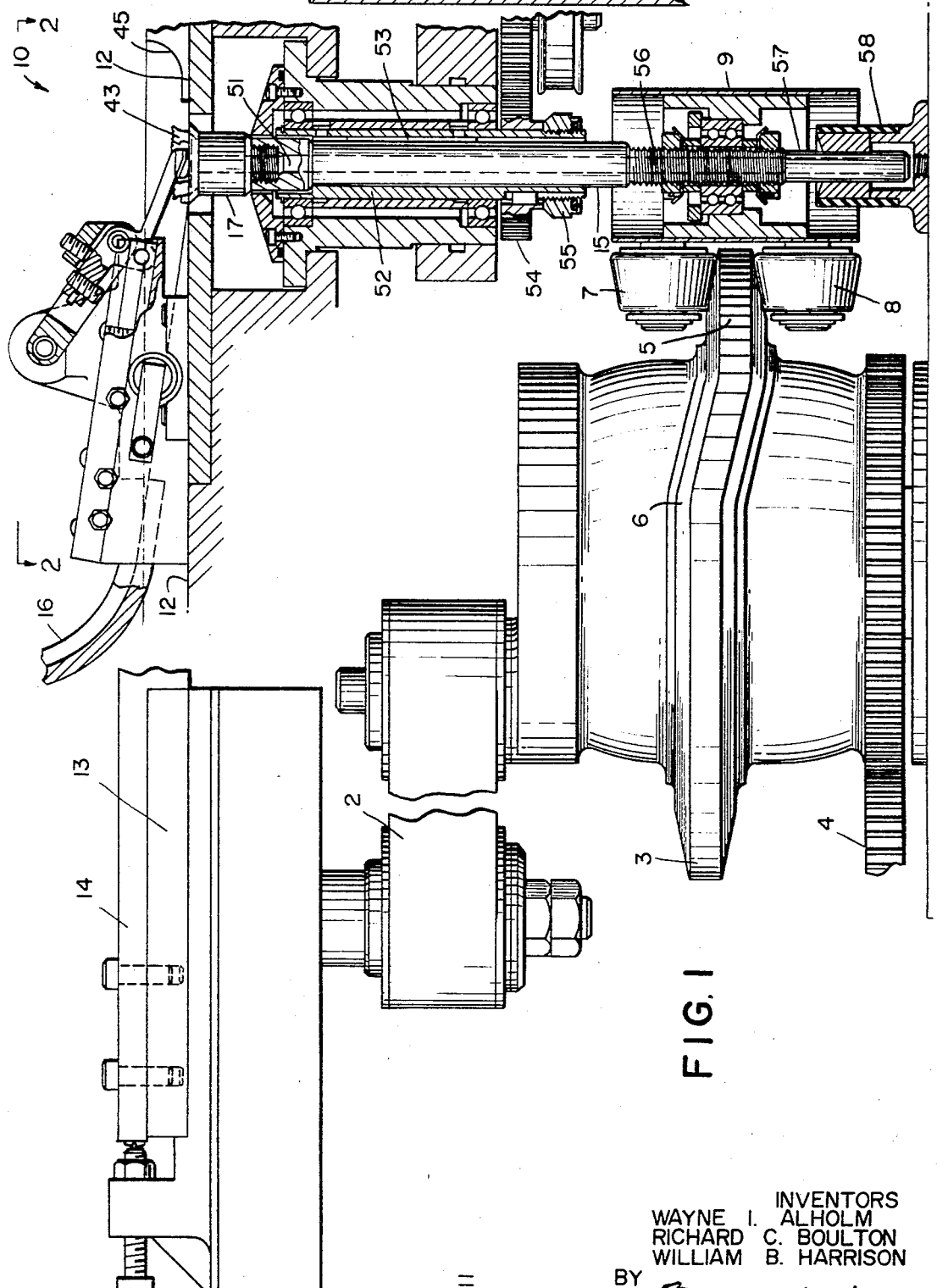
FIG. 1 is a side vertical elevation, partly in section, of the machine.

Referring to FIG. 1, the shafts, gearings, eccentrics and cams which secure the horizontal and vertical motions of the operating parts of the machine are housed in a box base 11. The base 11 is topped by a table forming a work surface 12 which is equipped with feed slide 13 which provides the bearing and support for the crosshead 14 at the closure feed station. Crosshead 14 is moved on the slide 13 by a rod 2 which is connected eccentrically to chuck lifting cam 3. The cam rotates and is driven by gear 4.

The circumferential track of the cam has a low dwell 5 and a high dwell 6 and rotates between a pair of spaced upper and lower rollers 7 and 8. The rollers are mounted centrally on chuck lifting beam 9. A chuck shaft 15 is mounted on each of the opposed ends of the lifting beam to permit lining of two closures simultaneously.

Chuck shaft 15 is hollow and terminates in a vacuum bearing (not shown). It includes a port 51 through which air is drawn through the lower end to appropriate exhausting apparatus (not shown). The shaft 15, which is quill mounted, both rotates and reciprocates axially in bearing 52 and is keyed to the bearing at 53. Rotative movement is provided by gear 54 which is threaded and keyed to the lower end of bearing 52. A threaded nut 55 locks the gear 54 on the bearing. The intermedate section 56 of chuck shaft 15 is threadedly engaged to the chuck lifting beam 9. The shaft 15 is raised and lowered by the beam when the high and low dwell sections of the cam 3 rotate between rollers 7 and 8. The lowermost section 57 of the shaft has a smooth outer surface to facilitate upward and downward movement. It is encased within a flexible tube 58 to maintain a vacuum within the chuck shaft.

If the closures 43 are bottle crowns, the unlined crowns are fed from an unscrambling apparatus (not shown) through a closure feeding means, such as chute 16, to the lining station which consists of chuck 7 surmounting chuck shaft 15. The chute 16 terminates in an extension 18 (FIG. 3) which is rigidly fixed to the work surface 12. The floor of chute extension 18 descends smoothly at an angle of approximately 8° until it merges substantially at the rim of chuck 17 with the top working surface 12.

Figure 3:
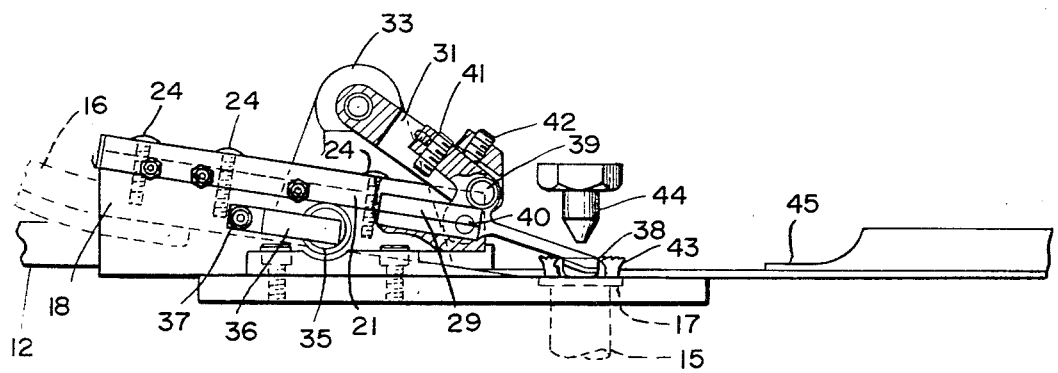
FIG. 3 is a side elevation, partly in section, of the improved feed mechanism and shows the location of the lining nozzle and the rotary chuck.
Figure 4:
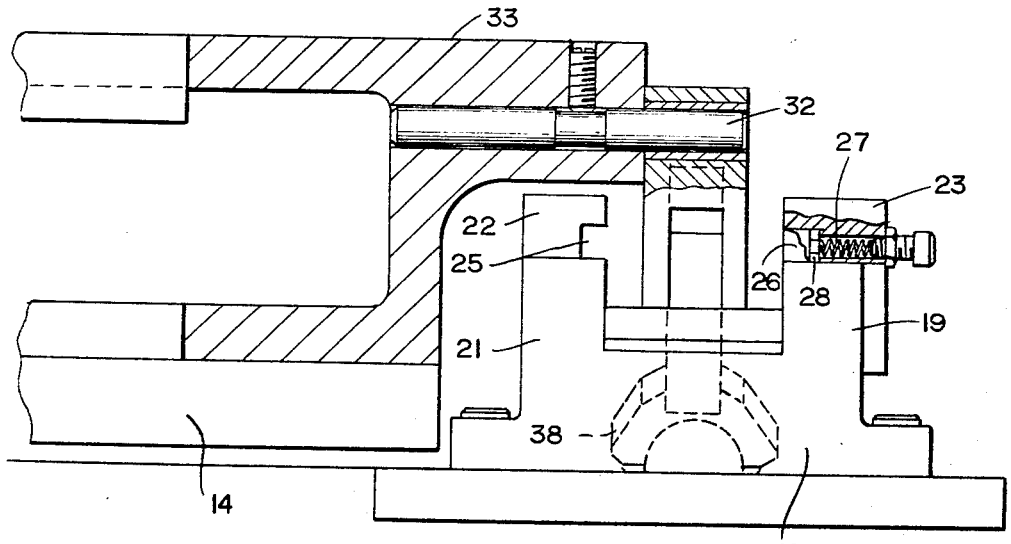
FIG. 4 is a partial cross-section of the trunnion bracket, chute extension and the pusher finger taken on a line 4—4 of FIG. 2.
Figure 5:
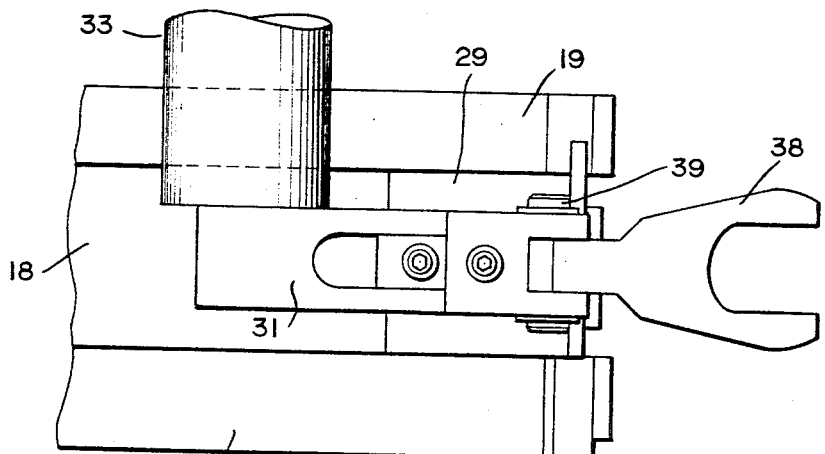
FIG. 5 is a partial top view of FIG. 1 showing the chute extension, slider, link and pusher finger.

As shown in FIGS. 3, 4 and 5, chute extension 18 inclines rearwardly from the lining station at an upward angle of about 8° and bears two parallel upstanding walls 19 and 21. These walls support gibs 22 and 23 which are affixed to the walls by suitable means, such as threaded bolts 24 (FIG. 3). Gib 22 is fixed and includes inclined way 25 while gib 23 includes inclined way 26 and is made adjustable by means of spring 27 bearing against plate 28 (as shown in FIG. 4).

Figure 2:
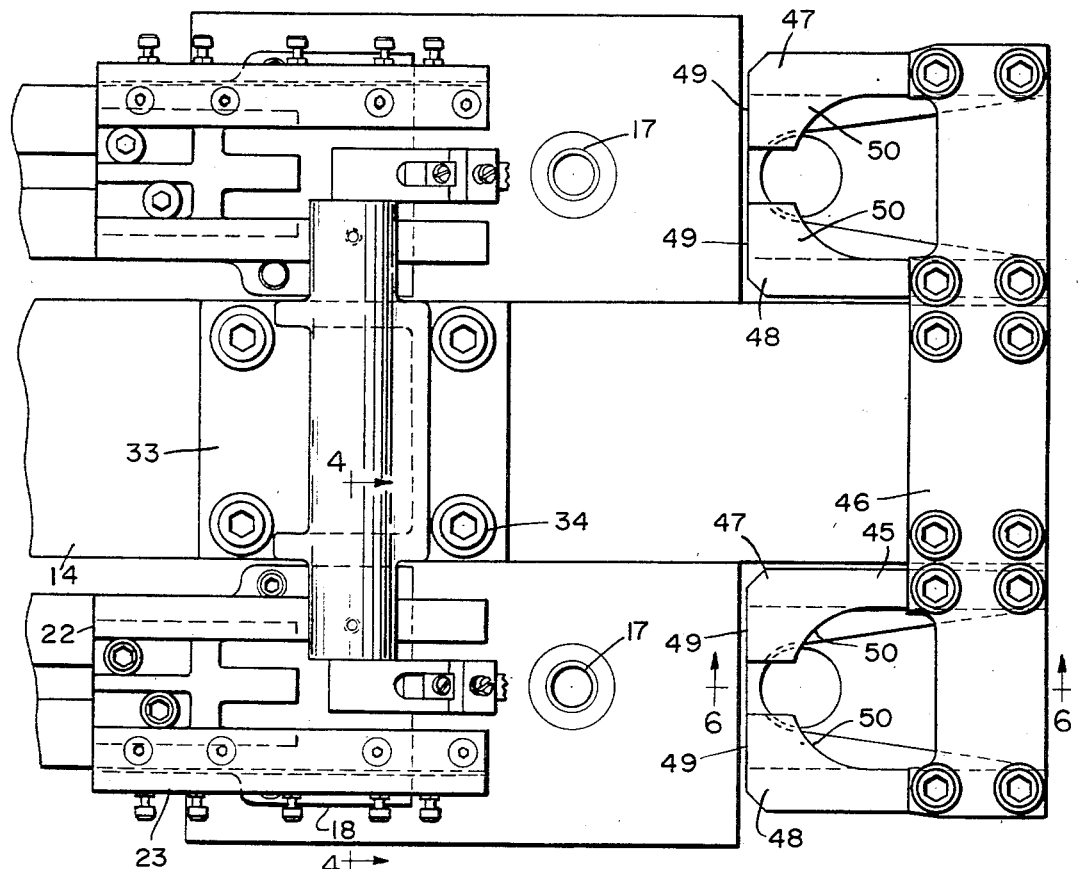
FIG. 2 is a top plan view of the work surface taken on the line 2—2 of FIG. 1.

Slider 29 (FIG. 5) is arranged to reciprocate in the ways 25 and 26 and is driven by link 31 which is attached by the hinge pin 32 to the trunnion bracket 33 (FIG. 4). In turn, trunnion bracket 33 is attached to the crosshead 14 by means of threaded bolts 34 (FIG. 2).

Closures which enter the chute extension 18 are arrested by oppositely facing spring pressed stops or detents 35 (FIG. 3). These project inwardly from the walls 19 and 21 and are pushed into stop position by the leaf springs 36 which in turn are secured in place by clamping pads 37.

A closure is carried from its stopped position at the rear of detents 35 by a pusher finger 38. The finger 38 is arranged to engage the inverted closure when it is in a stop position, urge it past the spring pressed detents and, while maintaining a downward pressure which holds the closure in firm contact with the floor of the chute extension 18, carry the closure forward until it is accurately centered on the revolving chuck 17. To accomplish this function, finger 38 not only is pivoted on the slider 29 but it is also engaged by the wrist pin 39 which projects from the link 31.

The position of the finger pivot pin 40 which connects the slider 29 and pusher finger 38 is slightly to the rear of wrist pin 39 when the finger 38 rests on the chuck. The finger 38 rocks back and forth on pin 40. This arrangement permits the pusher finger 38 to rise to a non-interfering position with the skirt of a closure before the slider 29 begins its backward movement when the link 31 is drawn rearward by the crosshead 14. Adjustable gib 23 imposes a slight resistance to the motion of the slider 29 and contributes to the rise of finger 38. When the stop screw 41 in finger 38 hits the slider, the slider 39 begins its rearward motion. As the crosshead retreats, the finger is maintained in the raised position. At this point, pivot pin 40 and wrist pin 39 are in vertical alignment. Stop screw 42, inserted in the link 31, adjusts the downward position of finger 38 on the forward stroke.

When the crosshead moves to the right (FIGS. 1, 2 and 3) the pusher finger 38 is urged downwards and engages the closure inside of its skirt at approximately its center line. As the crosshead advances, the pusher finger 38, which now bears down firmly on the closure, moves it past the spring pressed detents 35 and carries it forward while maintaining a downward pressure on the closure 43 until the closure is accurately seated on the vacuum chuck 17. At that instant, the timing of the machine is so arranged that the cam 3 raises the chuck shaft 15 and lifts the closure 43 which is seated on the vacuum chuck 17 above the work surface 12. At the same time, the crosshead starts its backward movement and pusher finger 38 rises to prevent any interference with the upward movement of the chuck 17 and closure 43. Practically simultaneously, nozzle 44 opens and discharges compound into the raised and rotating closure whereby the rotative force distributes the compound over the inner surface of the closure.

As the crosshead continues its retreat, a bifurcated takeaway member 45, which is supported by the bridge 46 and connected to the right end of the crosshead 14 (FIGS. 1 and 2), slides in beneath the rotating closure and the work surface 12. The cam motion now allows the chuck shaft 15 to drop and the closure, now resting on the takeaway member 45, is carried out of the lining station as the member 45 moves to the right. As the succeeding forward stroke begins, the next closure which has been arrested by the detents 35 will be engaged by the pusher finger 38 and urged into exact position over the vacuum chuck 17 as the crosshead completes its advance.

Figure 6:
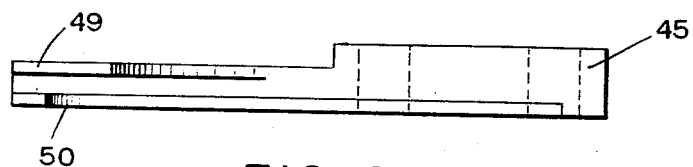
FIG. 6 is a sectional view of the prongs of takeaway member 45 taken on the line 6—6 of FIG. 2.

In one embodiment, the takeaway member 45 is comprised of a pair of spaced opposed prongs 47 and 48 converging toward each other. The converging ends of each prong are composed of spaced upper and lower plates 49 and 50 (FIG. 6). The space between the prongs and the space between the plates are governed by the dimensions of the particular closure being lined. The spacing between the prongs is, of necessity, less than the diameter of the closure to prevent slippage of the closure out of position when it is withdrawn from the lining station. The spacing between the plates is slightly in excess of the height of the closure at its skirt to provide sufficient clearance for the closure to remain in place between the plates when the closure is withdrawn. The converging plates of upper ends 49 are wider than the ends of the lower plates 50 to prevent the closure from escaping from the takeaway member as it is removed from the lining station.

Detents 35 are pressed inwardly and positively by the springs so that no escape of the closure forward of the detents is possible except for the considerable force which is given to the closure by the pusher finger. Since the detents are exposed to considerable scratching and cutting action by the burrs or raw edges of the closure, particularly from bottle crowns, they are made of a suitable wear-resistant material, such as tungsten carbide.

It is noted that the pusher finger 38 not only exerts a forward motion to the closure, but it positively places the closure on the chuck. In addition, the definite force which holds the closure down on the floor of the chute extension prevents any tilting or lifting as the closure moves into position on the chuck.

As shown in the drawing, particularly FIG. 1, the apparatus is designed to feed and line two closures simultaneously. Feeding is accomplished by mounting a pusher finger arrangement at each end of the trunnion bracket whereby closures are moved to separate chucks 17. The closures are lined with gasket-forming composition on the revolving chucks by separate nozzles which are positioned above the chucks. The lined closures are removed from the lining station by separate takeaway members. The trunnion bracket 33 to which the pusher fingers are mounted and the bridge 46 which supports the takeaway members are connected to the crosshead 14. Thus, as the pusher fingers move closures toward the chucks, the takeaway members retract; and as the takeaway members move toward the chuck to remove the lined closures, the pusher fingers move rearwardly to engage another set of closures. The chucks 17 are raised and lowered by separate chuck shafts mounted on opposite ends of the chuck lifting beam 9. The lifting beam is raised and lowered by a common can which rotates between the rollers 7 and 8 which are mounted centrally on the beam 9.

We claim:
1. A container closure lining machine comprising:
   (a) A base having a work surface,
   (b) a crosshead arranged to reciprocate on said work surface,
   (c) a closure feed chute having closure-engaging, releasable stop means,
   (d) a chuck positioned to receive closures from said chute, said chuck having means positively to engage a closure and arranged to rotate and to reciprocate vertically from the plane of said work surface to a point above said plane,
   (e) means attached to said crosshead and made operative by the crosshead motion to engage a closure arrested by said stop means, hold the closure in contact with said chute, advance said closure past said stop means and along said chute, place the closure in position on said chuck, and thereafter release the closure, and
   (f) means to eject a lining composition into a closure on said chuck.

2. Apparatus according to claim 1 wherein the means (e) adapted to engage a closure and advance it to position on said chuck comprises a depressible finger operatively connected to said crosshead, the said finger being adapted to depress and engage a closure when said closure is in the stop position and, while depressed, advance to place the closure directly on said chuck and thereafter rise to release the closure.

3. Apparatus according claim 1 which includes means to remove closures from the rotating chuck and comprises a bifurcated takeaway member adapted to slide between the closure and the work surface when said chuck is in its elevated position, strip the closure from said chuck when said chuck falls, and carry the closure out of the lining station as the pusher finger begins its next advance, said takeway member being operatively connected to the crosshead.

4. Apparatus according to claim 1 wherein the means (e) adapted to engage a closure and advance it to a position on said chuck is a pusher finger supported by and pivoted on a reciprocating slide, and wherein the operative connection between said finger and said crosshead is secured by a link engaging said finger at a point above and slightly to the rear of said pivot point whereby the reciprocating motion of the crosshead first causes the finger to depress as the crosshead begins its advancing stroke and causes the finger to rise and release the closure as the crosshead commences its retreating stroke.

5. Apparatus according to claim 1 wherein the means (e) adapted to engage a closure and advance it to a position on said chuck is a pusher finger which is pivoted on a slide and said slide operates in ways attached to said work surface, the said ways sloping upwardly from the vicinity of the lining station to the vicinity of the closure pickup station, and being provided with means to adjust the friction imposed on said slide.

References Cited

UNITED STATES PATENTS 3,333,571   8/1967   Kokinda _____ 118—318

CHARLES A. WILLMUTH, *Primary Examiner.*

J. P. McINTOSH, *Assistant Examiner.*